June 23, 1931.  J. W. HULME  1,810,967
ZONING AND FARE COLLECTING SYSTEM
Filed Oct. 23, 1929   5 Sheets-Sheet 1
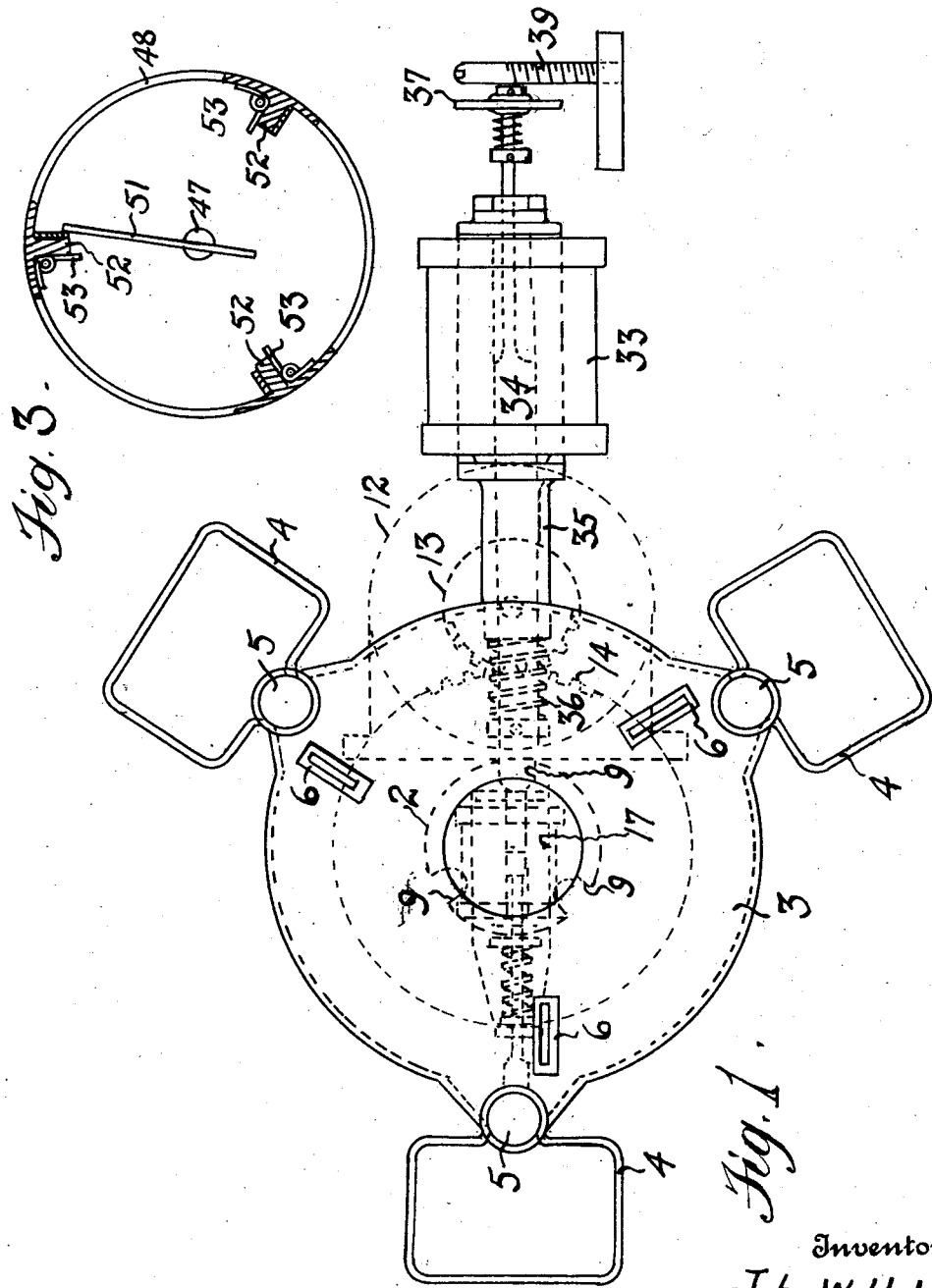
Inventor
John W. Hulme
By his Attorneys. Darby & Darby

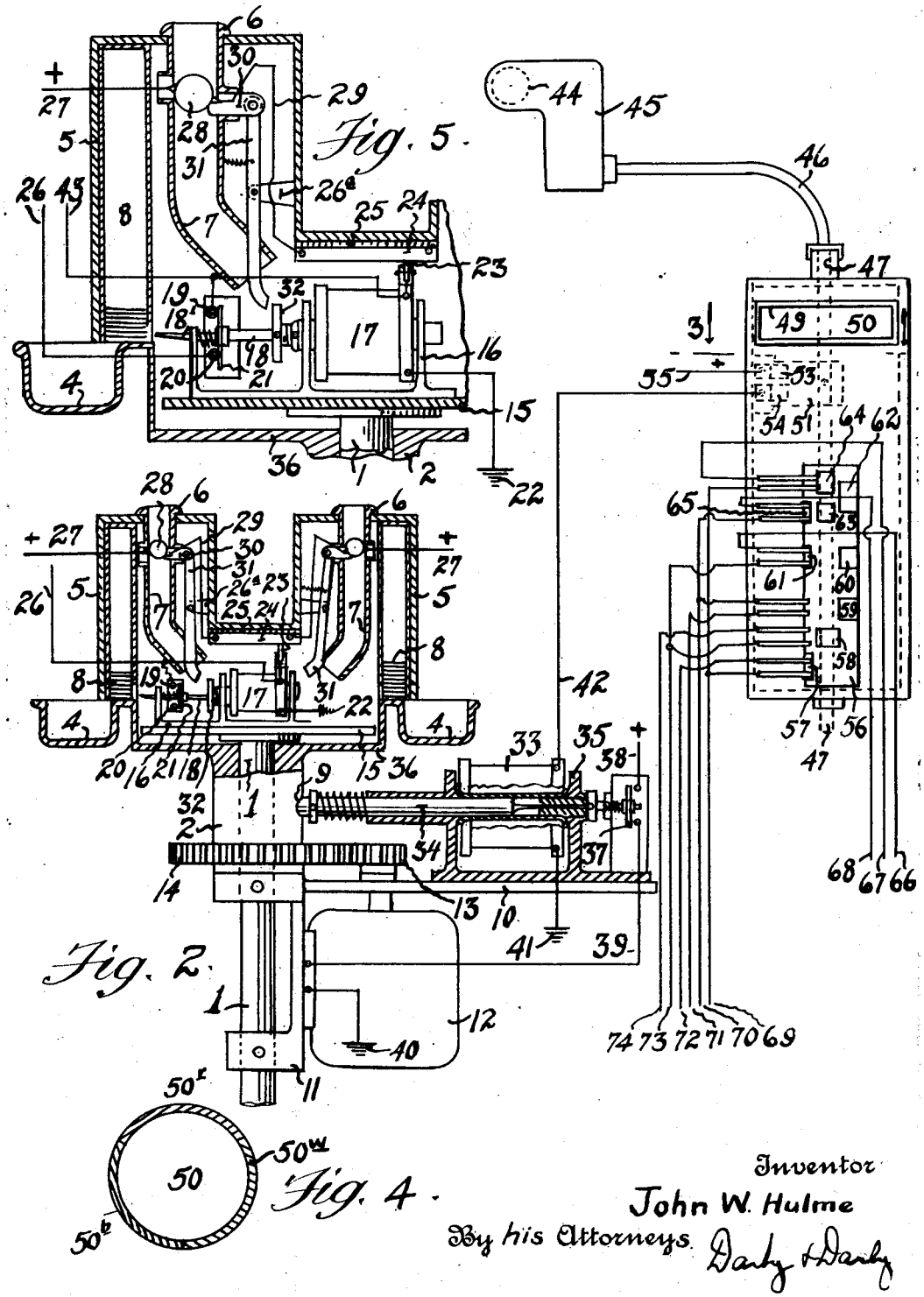

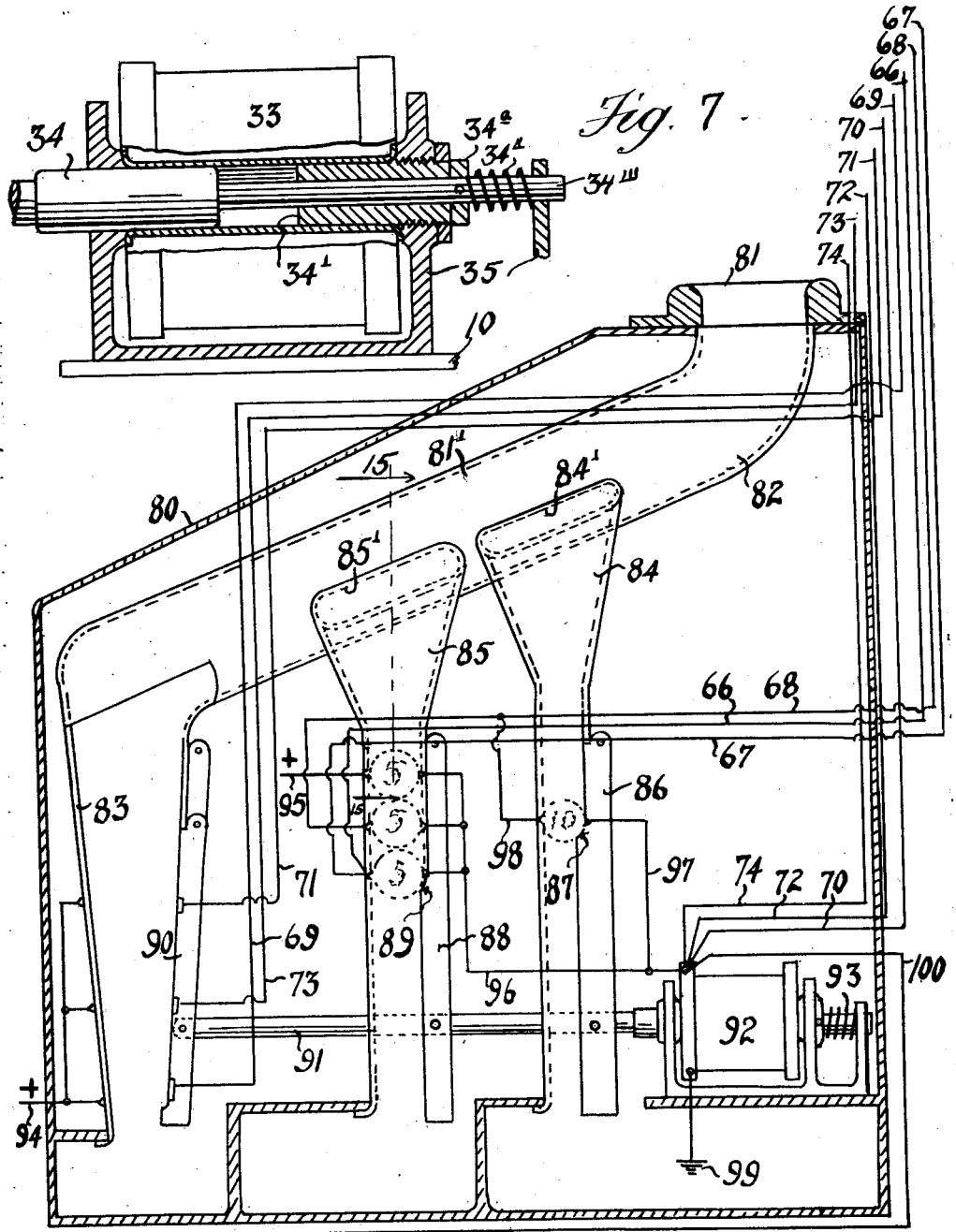

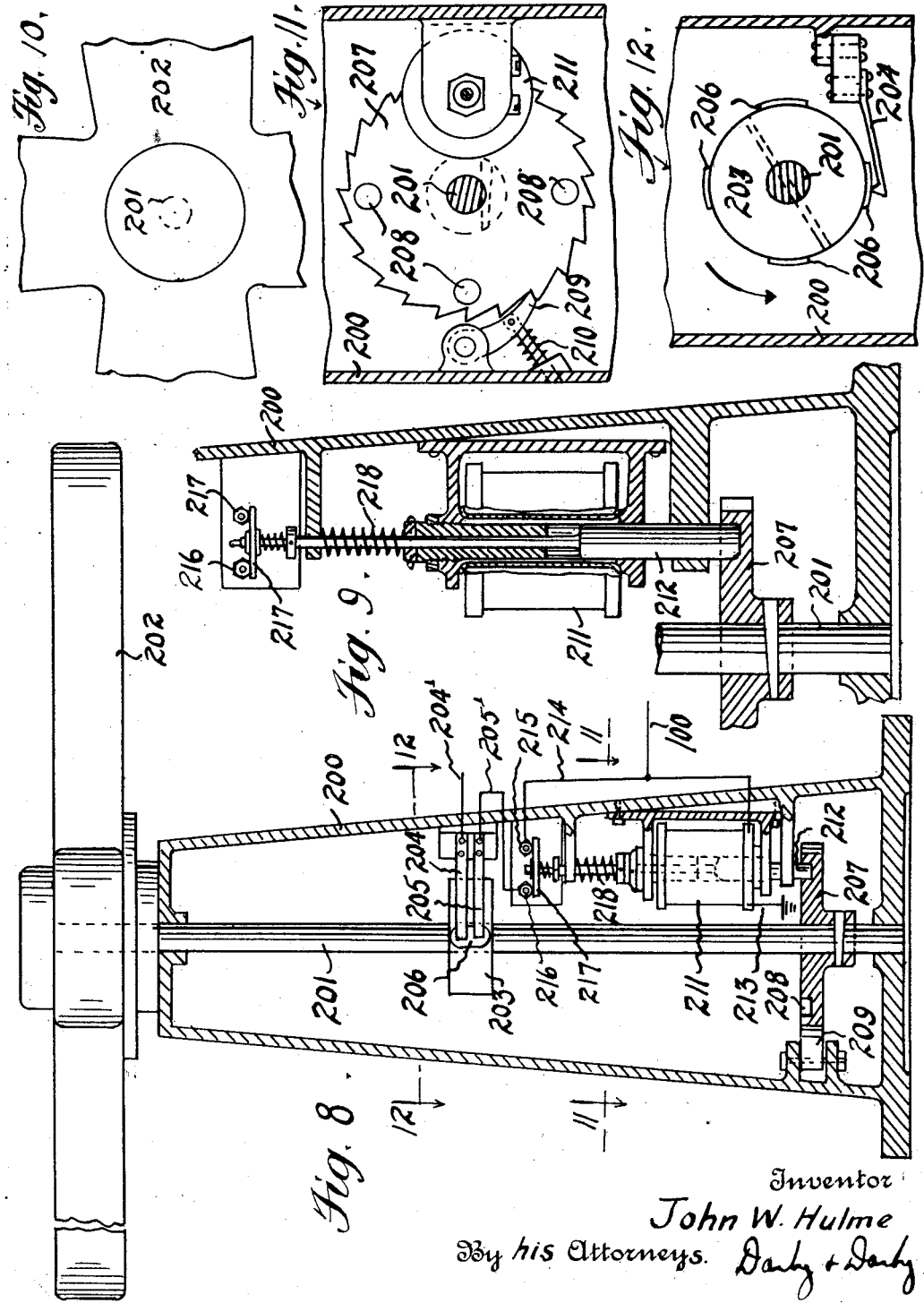

June 23, 1931.        J. W. HULME         1,810,967
ZONING AND FARE COLLECTING SYSTEM
Filed Oct. 23, 1929    5 Sheets-Sheet 5
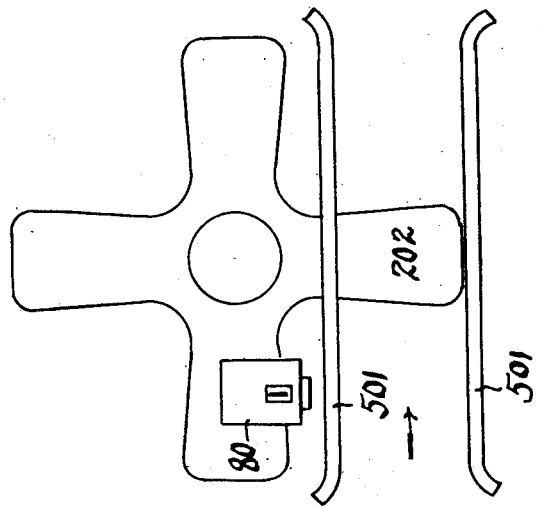
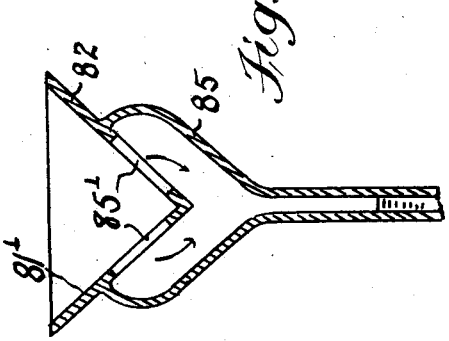
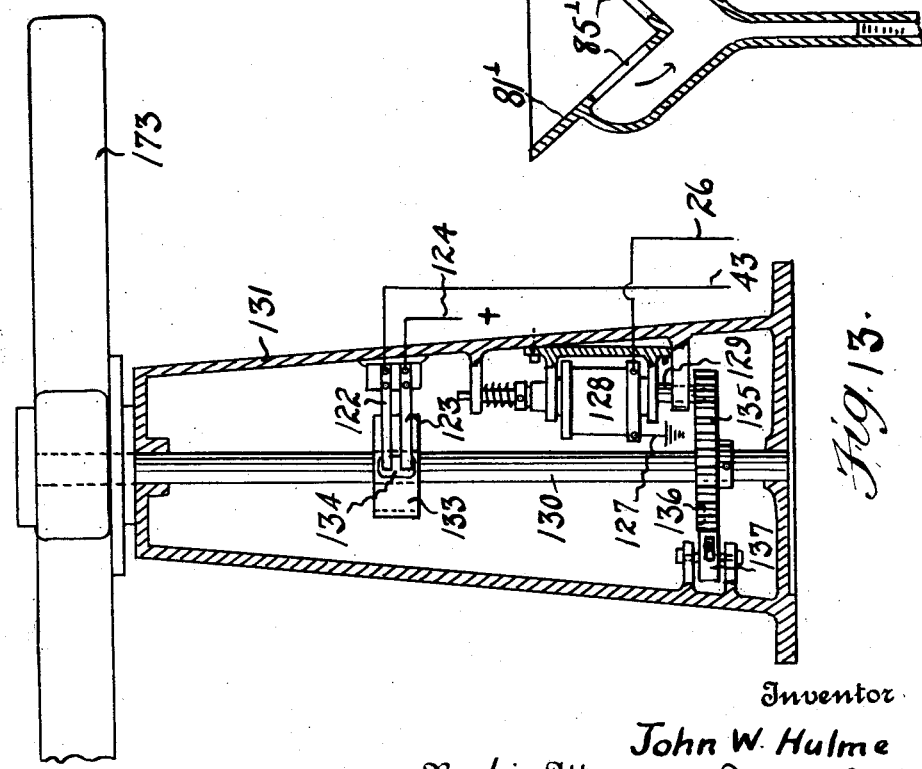
Inventor
John W. Hulme
By his Attorneys Darby & Darby Patented June 23, 1931

1,810,967

UNITED STATES PATENT OFFICE

JOHN W. HULME, OF JACKSON HEIGHTS, NEW YORK

ZONING AND FARE COLLECTING SYSTEM

Original application filed January 21, 1927, Serial No. 162,581. Divided and this application filed October 23, 1929. Serial No. 401,741.

This invention relates broadly to apparatus and means for separating passenger vehicle or common carrier systems into sections or zones to provide a basis for charging passengers in accordance with the distance they travel.

One of the objects of this invention is the provision of equipment adapted for application to present passenger vehicle systems such as railroads, subways, elevated lines, street-car lines, ferries and the like to provide fare collection apparatus whereby the passengers pay an amount in reasonable and approximate proportion to the length of their trip.

A further object of this invention is to provide apparatus which may be readily applied to buses or street cars and similar passenger vehicles to automatically divide the trip into predetermined zones in order that a fare may be charged in accordance with the length of the trip.

A still further object of this invention is to provide equipment as generally indicated above by means of which a passenger may deposit the necessary coin or coins therein and receive a token representing by physical characteristics, such as color, size, configuration or material the particular zone of the system in which the passenger enters the system for transportation.

Another object of this invention is the provison of a turnstile apparatus operated by the deposit of a coin to permit the passenger to enter a restricted area through which the transportation system runs or to enter a carrier of any kind upon the deposit of the proper coin.

A still further object of this invention is to provide a coin operated device for effecting both the delivery of a token and the admission of a passenger to a point of access to the vehicle or to the vehicle itself.

Another object of this invention is to provide a device operated in conjunction with exit turnstiles to permit the exit of a passenger from the restricted area or a carrier upon the deposit of the token which he received on entering the system or upon the deposit of coins of sufficient amount or upon the deposit of a token and additional coins of sufficient amount.

A still further object of the invention is to provide equipment for use on buses or street cars and the like which is operated from the drive-shaft or wheels or other moving part of the vehicle to effect automatic rearrangement thereof upon passing from one zone to another to adapt it for delivery of a token representative of the zone in which the bus is traveling.

Another object of this invention is to provide indicating means on a bus to indicate to the passengers when the bus is about to leave one zone and enter another.

A still further object of this invention is to provide entrance and exit turnstiles of a particular form adapted to cooperate with coin controlled entrance equipment and coin or token controlled exit equipment.

A still further object of this invention is to provide coin controlled token delivering apparatus having a plurality of token magazines that is one for each zone of the system so that a passenger, by depositing the amount required to travel to any particular zone will get a token which will permit his exit from the zone represented by that token upon its deposit in suitable equipment.

These and many other objects which will become apparent from the following description are secured by the present invention.

This invention resides substantially in the system, combination, construction, arrangement, circuital connections and relative location of parts as will be apparent from the following disclosure.

This application is a division of my copending application Serial No. 162,581, filed January 21, 1927.

Referring to the drawings where the same reference numerals have been used in corresponding views wherever possible to indicate the same or similar parts:

Figure 1 represents a top plan view of the coin controlled token delivering device used on buses or street cars employing my invention;

Fig. 2 represents a vertical cross sectional view of the bus token delivering device and a plan view of the drum switch to be driven from the drive-shaft;

Fig. 3 is a cross sectional view taken on the line 3—3 of Fig. 2 looking in the direction of the arrows showing the switch for controlling the position of the token delivering device;

Fig. 4 represents a cross sectional view of the zone indicating device operated by the movement of the drum switch;

Fig. 5 represents an enlarged vertical cross sectional view of one of the token delivering devices disclosed in the arrangement of Figs. 1 and 5;

Fig. 6 is a cross sectional view through the casing of the coin and token operated device for controlling the exit movement of a passenger from a bus and the like, showing diagrammatically the circuit connections to the various parts;

Fig. 7 is an enlarged view partly in cross section of the electro-magnetic equipment used on the coin or token operated equipment for releasing the coin or token after it has performed its function;

Fig. 8 is a vertical cross sectional view of an exit turnstile adapted for use on either train or bus systems;

Fig. 9 is an enlarged cross sectional view with some parts broken away of the electro-magnetic equipment for controlling the operation of the exit turnstiles;

Fig. 10 is a top plan view with the parts broken away of the barrier, forming part of the turnstile, which projects into a restricted passage-way;

Fig. 11 is a cross sectional view taken on the line 11—11 of Fig. 8 looking in the direction of the arrows showing the arrangement of the parts for controlling the movement of the turnstile;

Fig. 12 is a view taken on the line 12—12 of Fig. 8 looking in the direction of the arrows showing the switch mounted on the turnstile for providing a holding circuit for the magnet which controls the turnstile operations;

Fig. 13 is a vertical cross sectional view through the entrance turnstile;

Fig. 14 is a top plan view of the relative arrangement of the exit turnstile, side rails and coin, and/or coin, and/or token controlled device for releasing the exit turnstile; and Fig. 15 is a cross sectional view taken on the line 15—15 of Fig. 6 showing the chute construction.

It has always been the desire of those interested in the construction and operation of passenger vehicle systems where the passenger himself controls his entrance and exit thereto by deposit of coins to provide more or less automatic apparatus which will permit of charging the passenger a fare approximately proportional to the length of the trip which he desires to take. It is, of course possible, by employing a suitable number of conductors or ticket takers to charge a suitable amount for the particular trip which each passenger takes as is done in the present railway systems. However, on those systems where the passenger by the deposit of his fare in suitable apparatus, as in the present subway systems, controls his admission to the restricted area of the stations, so far as I know there has never been successfully devised a system which will automatically permit the passenger to be charged an amount proportional to the length of the trip which he desires to take and still maintain the system in the form where the passenger by the deposit of the correct fare can himself control his entrance to the restricted areas of the station.

I have devised, as will appear in the following description, the necessary equipment whereby a passenger vehicle line or route may be broken up or divided into a suitable number of zones so that a passenger may be charged a fair amount approximately proportional to the length of the trip he desires to take. At the same time I have kept the system in the form where a passenger by the deposit of one or more suitable coins may himself control his entrance to and exit from the restricted areas of the platforms at the stations. For purposes of illustration I have shown the necessary equipment for a three zone system and have so arranged the parts that a passenger may enter the system at any zone and travel to any other zone of the system paying an amount, approximately proportional to the length of the trip.

As will also be apparent from the disclosure, I have constructed apparatus which is adapted for use either on subway trains, steam operated trains, street-cars, elevated lines, ferries and all similar carrier systems and at the same time I have embodied the principles of my invention in an apparatus adapted for use on road vehicles such as buses and the like.

I will describe briefly in order to give a comprehensive view of the principles of my invention, the necessary procedure which a passenger goes through in traveling on trains or buses equipped with the apparatus of my invention.

At the entrance to the platform of each station or at the door-way of a bus or street cars I provide a token magazine which, upon the deposit of a five cent piece or similar coin will deliver to the passenger a token representing the particular zone at which the vehicle is when he boards it.

For purposes of illustration in a three zone system, I propose to use three sizes of tokens, each of a distinctive color, thus, zone 1 would be represented by a red token, zone 2 would be represented by a white token of larger size, and zone 3 would be represented by a blue token of still larger size. I do not, of course, intend to limit the token to any particular size, shape, color or material, since these characteristics may be changed without departing from the principles of this invention. It may also be noted again that the particular number of zones into which a system may be divided, is not limited by the apparatus invented by me since any number of zones may be employed.

The passenger then upon depositing the coin passes through a turnstile which is also controlled by the deposit of the coin and he then receives a token representing the particular zone he is in. He is then free to board the next train, if it is in a train system, or to enter, if it is a bus or other common carrier. The token magazine and the turnstile in the case of the buses or the like, will of course, be mounted on the carrier so that on passing through the turnstile, the passenger is free to enter. When the passenger desires to leave the train or bus, if he is in the same zone in which he entered the vehicle, he merely deposits the token in the exit device which controls the exit turnstile and passes out of the vehicle. If, however, the passenger has remained on the vehicle until it has traveled to the next zone he may leave the vehicle by depositing the token and an additional five cents, or other predetermined amount, or a token equivalent thereto. If the vehicle has passed into a third zone he may leave by depositing the token and two five cent pieces, or a ten cent piece or other predetermined amount, or one or more tokens equivalent thereto. The deposit of the token or the token and coins or predetermined combinations of them controls the operation of the exit turnstile.

I have also constructed the apparatus of my invention so that should the passenger lose his token, he can leave either the train or bus by depositing a predetermined amount in the exit device, for example, the charge could be placed at the maximum for a full trip over the whole line or at any suitable amount which may be thought desirable.

In connection with the train systems where the vehicle travels over a fixed rail route and stops at regular stations the entrance and exit devices are properly wired for the particular station at which they are disposed. On buses which employ the apparatus of my invention it will be apparent that as the bus passes from one zone to another, the token delivering device must be changed to deliver a token representing the new zone in which the bus is moving. I have devised an apparatus for accomplishing this result as will appear hereinafter.

While I have disclosed what may be termed electrical equipment for carrying out the functions of my invention, I wish it to be particularly understood that the apparatus is equally well adapted for manual, mechanical, pneumatic or electro-pneumatic operation and I do not therefore desire to be limited to electrical operation entirely, but intend that my claims shall cover manual, mechanical, pneumatic and electro-pneumatic operation as well as electrical operation.

I have also devised a multiple token magazine which may be disposed at each train station or on each bus so that a passenger may, knowing the particular zone he desires to travel to, deposit an amount equal to the fare to that zone and receive a token which will permit him to leave the train or bus when he reaches that zone, without the further deposit of money coins. A multiple token magazine in that form of the invention will have as many magazines as there are zones so that by depositing the correct amount in the correct coin slot, the passenger will receive the proper token to permit his exit from a station in the zone to which he intends to travel.

Referring now to Figs. 1, 2, 3, 4, 5, 6, and 7, I will describe the construction of the apparatus for use on buses or street cars employing my invention. I have shown at 1, a vertically disposed shaft mounted in a suitable bracket 10 for rotation. The lower end of the shaft may be seated in a suitable base plate to permit its rotation and support. The bracket or support 10, also provides a rest on which the large spider 2 may be rotatably supported. The spider 2 encircles the shaft 1 and is provided with a casing 3, having a plurality of cup members 4 mounted thereon. Disposed above and adjacent to each of the cups is a token magazine 5 of which there will be as many as there are zones in the system. Arranged adjacent each of the magazines is a coin receiving slot 6 extending through the cover of the casing 3 and opening into the coin chutes 7. At 8 are shown the tokens in each of the magazines. As stated before, these tokens may have any number of a variety of characteristics so as to indicate the particular zone which they represent. The cylindrical portion of the spider 2 is provided with notches 9 of which there are three in the case of a three zone system. Also encircling the shaft 1 is a bracket 11 in which the shaft may rotate on which is supported a suitable electric motor 12 having a spur gear 13 keyed to the shaft. This spur gear meshes with a large gear 14, permanently secured to the cylindrical portion of the spider 2. A supporting platform 15 is secured to the upper end of the shaft 1 within the casing 3. A suitable supporting frame work 16 is secured to the member 15 and has mounted therein, an electro-magnet 17 having a core 18 adapted to slide in the frame work 16 when the magnet is energized. Mounted on the plunger or core 18 and insulated therefrom is a metallic contact member 21. Disposed on a suitable insulating supporter adjacent to the contact member 21 are two terminal studs 19 and 20 so arranged that when the magnet 17 is energized, the contact member 21 bridges the two studs 19 and 20. The construction is more clearly shown in Fig. 5. The end 18' of the plunger 18 is of reduced cross section and is adapted to pass into the particular token magazine in alignment therewith to eject a token from the magazine into the cup 4 when the magnet 17 is energized.

The winding of the magnet 17 is grounded at 22. Mounted on the magnet is a brush 23 adapted to provide rubbing contact with a commutator disc 24 secured to the casing 3 and insulated therefrom by means of the member 25. Pivotally mounted at 26A within the casing 3, is a lever 31 having pivotally mounted thereon at its upper end, a short arm 30 which projects into the coin chute 7 and has mounted thereon an electrical contact.

A similar contact is shown opposite thereto and is connected by a wire 27 to the positive terminal of a current source. The terminal on the arm 30 is electrically connected by means of the wire 29 to the commutator 24 and the brush 23 is electrically connected to the terminal stud 19. The wires 26 and 43 extending from the terminal studs 19 and 20 respectively, are connected to the entrance turnstile as will be more clearly described shortly. The lower end of the pivoted arm 31 extends adjacent to a disk 32 mounted on the plunger 18.

The bracket or frame work 35 is supported on the structure 10 and has mounted therein, another electro-magnet 33 which has slidably mounted therein, a plunger or core 34. The rounded end of the core adjacent the spider fits into the notch thereon and is normally held therein by a spring 36 when the magnet 33 is deenergized. The other end of the core has mounted thereon and insulated therefrom, a contact disc 37 which is adapted when the magnet is energized to bridge the terminal studs of the circuit wires 38 and 39. The wire 38 connects to the positive side of the current source and the wire 39 is connected to the electric motor 12. The other terminal of the motor 12 is grounded at 40. The electro-magnet 33 has one terminal grounded at 41 and has its other terminal connected through the wire 42 to one of the stationary contacts 54 mounted inside of the drum switch 48.

Another contact 53 is mounted adjacent to the contact 54 and connected to the positive side of the current source by the wire 55. A spring switch arm 51 is mounted on the shaft 47, and is adapted to be rotated therewith. If necessary this arm may be insulated from the shaft and is adapted to bridge the contact fingers 53 and 54 and to remain thereon a predetermined length of time and then be quickly snapped therefrom by the rotation of the shaft 47.

It will be noted for a three zone system there are three sets of these contacts mounted on the drum. All this is clearly shown in Figs. 2 and 3. The drive-shaft of the vehicle is shown at 44 and is connected through a set of gears within the casing 45 to a flexible shaft 46. The shaft 46 is connected to the shaft 47 and is adapted to rotate it at a predetermined speed. The relative speed of rotation of the shaft 47, with respect to the shaft 44, will be predetermined by the sizes of the gears within the casing 45. The connection to the drive-shaft will be made on the side of the clutch opposite from the engine so that the shaft 47 will only move when the vehicle is in motion. It is even contemplated by me to drive the shaft 47 from one of the wheels of the vehicle if this is found desirable. The drum 48 is supported by the shaft 47, but is stationary. The window of opening 49 is provided in the drum and an indicator 50 is mounted on the shaft 47 to rotate with it and to be visible through the window 49. For the three zone system the indicator 50 will take the form of a cylinder having three sections of 120° extent, each section being of a different color and each color representing one of the zones, thus $50^r$ indicates the red zone, $50^w$ the white zone, and $50^b$ the blue zone. It is proposed to place the drum within the vehicle in such a position that it will be visible to the passengers. Thus they can see by observing the window 49 what zone the vehicle is in and when it is about to pass from one zone to another so that they may leave the vehicle if they do not wish to pay an additional fare.

Mounted within the drum 48 and on the shaft 47 is an insulating cylinder 56 having thereon the contacts 57, 58, 59, 60, 61, 62, 63, 64 and 65. These contacts are arranged on the cylinder 56 in such positions with respect to each other that they may, as the shaft 47 rotates, establish suitable connections between the spring fingers mounted on the inside of the drum 48 so that the token and/or coin controlled device for operating the exit turnstile may be adapted to be operated only by the correct token and/or fare necessary to permit the exit of the passenger depending upon how far he has traveled. As the bus proceeds from one zone to another, the drum switch 56, which rotates at a relatively slow speed, will change the connections at the spring fingers by reason of the movement of the contact pieces on the drum so that the connections to the coin and/or token operated device will be changed so that the exit turnstile can only be operated by the proper token and/or coin for that particular zone. The same movement of the drum 56 by the rotation of the shaft 47, causes the indicating device 50 to move so that the passengers can observe when the bus is about to pass from one zone to another. If desirable, it is evident that a multiple switch operated by the movement of the shaft 47 can be used to energize a signal device to call the passengers' attention to the fact that the bus is about to pass into another zone. It will be evident also that by staggering the contacts on the drum 56 with respect to each other, that the bus can travel a predetermined distance into the next zone before the indicator shows this and before the connections are changed and before the signal is operated so that passengers getting on near the end of one zone would only be required to pay a single fare if his exit occurs between the minimum and maximum limits guaranteed.

Referring now to the connections from the drum switch to the device which controls the exit turnstile and considering Figures 2 and 5 together, it will be seen that the wires 66, 67 and 68 which are connected to fingers pressing on the contacts 61, 64 and 65 are also connected to terminals on the coin chutes 84 and 85. The wires 69, 70, 71, 72, 73 and 74 are also connected to some of these terminals as well as terminals in the token chute 83 and to one of the terminals of the magnet 92.

Referring particularly to Fig. 6 the token and/or coin device for controlling the exit turnstile is contained within a suitable casing 80 having a slot 81 in the top thereof for receiving coins and tokens which opens into an inclined V-shaped chute 82. The construction of the coin chute 82 will be described more clearly in connection with Fig. 15. The lower end of the chute 82 opens into a vertical converging token chute 83 and is also provided with openings which deliver coins into the coin chutes 84 and 85. Pivotally mounted in a slot in the edge of these chutes 84 and 85 are non-conducting levers 86 and 88 respectively which are provided with bumps or projections 87 and 89 respectively to retain the coin in the chute when they are in their normal positions. The lever 88 is provided with several contacts all connected together by the single wire 96 which terminates at one terminal of the electro-magnet winding 92. There is a single contact on the lever 86 which is likewise connected to the same magnet terminal by the wire 97.

A similar non-conducting lever 90 is pivotally mounted in a slot in the edge of the token chute 83 and is provided with three contact terminals mounted opposite these contacts on the other edge of the chute 83 and insulated therefrom are three other terminal contacts which are all electrically connected together and to a wire 94 leading to the positive terminal of the power source. The uppermost contact at the left of the coin chute 85 is connected by the wire 95 to the positive terminal of the current source. The next terminal below this connects to the wire 68 and the lowermost terminal at the left is connected to the wires 66 and 67. The single contact at the left of chute 84 is connected by the wire 98 to the wire 68. The remaining terminal of the magnet 92 is grounded at 99.

The levers 86, 88 and 90 are pivotally connected to a rod 91 operated by the plunger of the electro-magnetic solenoid 92 and is maintained in such a position by the spring 93 as to hold these levers in their normal position in the slots of the chutes as shown in this figure. A single wire 100 leads from the upper terminal of the magnet 92 to the coil of the exit turnstile which releases it for operation as will be described hereinafter.

In Fig. 7 is shown the construction of the magnet and mounting for operating the holding dog on the multiple token magazine shown in Fig. 2. The construction comprises a suitable frame work 35 mounted on the support 10 in which is secured the solenoid winding 33 having a fixed internal pole piece 34' which is centrally bored. The sliding plunger or armature 34 is attracted by the pole 34' when the winding 33 is energized. An extension of the plunger 34 passes through the pole pieces 34' as shown at 34'''. A collar 34ª is secured to the extension 34''' and serves to compress the spring 34'' when the plunger 34 moves to the right. As soon as the magnet 33 is deenergized, the spring 34'' returns the plunger to its normal position at the left. This description of the magnet 33 will be sufficient for the magnets 17, 33, 92, 109 and 211. The construction of all these magnets is substantially the same and any slight variations will be pointed out in connection with the particular magnets.

This completes the description of the equipment necessary for operating buses or street cars in accordance with the principles of my invention with the exception of the turnstiles 5 and their association with the equipment which will be described later. I consider it within the scope of my invention to manually collect the tokens at the exit point and manually receive the appropriate additional fare due, if any, as indicated by a physical characteristic of the token such as size, shape, color, and so forth. This is especially true where my invention is applied to buses, street cars and other transportation systems where an attendant is present, as for instance the bus driver, car conductor, or motorman.

The entrance turnstile is shown comprising a casing 131 having therein the vertical shaft on which the barrier arms 173 are mounted. Mounted on the shaft is a drum of insulating material 133 having four contact plates 134 on its periphery, separated 90° apart, similar to contacts 206 in Fig. 12. Supported on the casing and insulated from each other are the spring fingers 122 and 123 which contact with one of the plates 134 in any one of the four normal positions of the barrier arms. Spring finger 123 is connected by wire 124 to the positive side of the current source. Spring finger 122 is connected by wire 43 to wire 43 in Fig. 5. Mounted on and near the lower end of shaft 130 is the ratchet wheel 135 engaged by a pawl 137 so that it can rotate in one direction only, and provided with four recesses 136 spaced 90° apart in a manner similar to the recesses 208 in Fig. 11. Mounted on the casing is the solenoid winding 128 which is grounded at 127 by one terminal and which has its other terminal connected to wire 26 which connects with wire 26 in Fig. 5. When solenoid 128 is energized its plunger 129 is elevated out of the depression 136 and the barrier arms are free to be rotated in one direction only. The operative association of this entrance turnstile with the token delivering mechanism of Figs. 2 and 5 will be described later.

The construction of the chute 82 which is used in the exit device is clearly shown in Figs. 6 and 15. The chute 82 comprises the inclined V-shaped channel 81' having the openings 85' and 84' which are enclosed by the sides of the vertical chutes 85 and 84 respectively. The opening 84' is of sufficient size to let a ten cent piece pass therethrough, and the opening 85' is of sufficient size to permit a five cent piece to pass therethrough. These openings appear on both sides of the channel and are of sufficient lengths for the particular inclination of the channel to prevent the coins from passing by the proper opening and not entering the correct chute. The lower end of channel 81' is cut away to permit a token to fall into the vertical chute 83. I have so designed these chutes or channels that no matter how rapidly the coins and tokens are dropped there into they automatically pass through the correct opening, and into the correct chutes.

While the exit turnstiles are of approximately the same construction as the entrance turnstiles, a complete description will be given in connection with Figs. 8 to 13 in order to make a complete disclosure. The turnstile casing is shown at 200 having the vertical, rotatable shaft 201 with the barrier arms 202 mounted thereon in the form of a cross. An insulating drum 203 is mounted on the shaft 204 and has four contacts 206 mounted on the periphery to close a circuit connected to the two spring fingers 204 and 205. Near the lower end of the shaft 201 is keyed the ratchet wheel 207 having four recesses 208 on its face. The pawl 209 pivotally mounted on the casing 200 is resiliently pressed against the ratchet 207 by the spring 210. This permits rotation of the barrier arms in a counter-clockwise direction (see Fig. 11) when a coin is deposited, but prevents its rotation in the clockwise direction. The magnet winding 211 is mounted within the casing 200 and has the slidable core 212 adapted to seat in the recesses 206 on the ratchet 207. When the magnet 211 is deenergized, the spring 218 forces the plunger 212 against the face of the ratchet wheel 207 so that it will drop into one of the recesses 208 when they become aligned. The winding 211 is grounded at 213 and is connected by the wire 214 to a terminal stud 215. A juxta-opposed terminal 216 is connected by the wire 205' to the spring finger 205. The spring finger 204 is connected to the positive side of the current source by the wire 204'. Mounted on the upper end of the plunger 212 and insulated therefrom is a metallic contact member 217 which closes the circuit between the terminals 215 and 216 when the magnet is energized. A circuit connection is made from the wire 214 to the wire 100.

Figs. 9, 10, 11 and 12 more clearly disclose the construction of the turnstile in Fig. 8.

The entrance and exit barriers are shown used in connection with parallel rails 501 (Fig. 14) which provide the only entrance to and exit from the bus and through which the passenger must move in either entering or exiting. The arrangement of Fig. 14 shows also the relative position of the coin and/or token controlled device 80 which releases the turnstile for exit movement. For entrance movement the rotatable token magazine of Fig. 1 will be suitably positioned with respect to the turnstile and the guide rails.

I will now describe the operation of these devices as applied to bus systems. As we have stated before, the necessary equipment for a transportation line divided into three zones has been described and the operation of such three zone systems will now be discussed.

Referring first to Figs. 1 to 7 inclusive which relate to apparatus for dividing a bus route into zones, I will describe the operation of this apparatus. I will assume for purposes of description that the arrangement of the apparatus in these figures is such as it would be when the bus is in zone 1. The cup 4 and its associated magazine 5 will then be disposed adjacent the entrance passage-way of the bus in which an entrance turnstile of the type shown in Fig. 7 is disposed. The passenger then desiring to get on the bus will deposit a coin in the slot 6 which will cause the following operations:

Referring to Fig. 2 the coin 28 closes the circuit from the positive side of the current source through the wire 27, wire 29, commutator disc 24, brush 23 through the winding 17 and to ground at 22 which completes the circuit to the negative side of the current source which is grounded. This energizes the solenoid 17, forcing the lever 18 to the left to close the circuit connected to the wires 26 and 43 through the terminal studs 19 and 20 and the contact member 21. The same movement of the rod 18 carries the member 32 to the left causing the lever 31 to withdraw the short arm 30 from the chute 7 to release the coin into a suitable coin retaining compartment. The reduced portion 18' of the lever 18 also forces a token into the cup 4 from whence it is taken by the passenger. As stated before, a turnstile of the type shown in Fig. 13 is associated with the entrance way of the bus and the winding 128 thereof is connected to the wire 26 while the other terminal is grounded as at 127. The wire 43 will be connected to one of the spring fingers 122 while the other spring finger 123 is connected to the positive side of the current source. These two fingers 122 and 123 provide a holding circuit for the winding 128 and the winding 17 when the coin 28 is released causing the circuit for the winding 17 through this coin to be broken. This holding circuit is maintained as follows:

The current passes from the positive side of the current source through the wire 124, finger 123, contact 134, finger 122, wire 43 to terminal stud 19, contact member 21, terminal stud 20, wire 26 to one terminal of the winding 128. The current also passes from the terminal stud 19 through winding 17 to ground. The other terminal of the winding 128 is also grounded. Thus, it will be seen that as long as the contact 134 bridges the two spring fingers, the windings 17 and 128 will be energized even though the coin 28 has passed into its retaining compartment. The energization of the winding 128 raises the plunger 129 and holds it there until the turnstile has been moved a sufficient distance to move the contact 134 out of alignment with the spring fingers. When this occurs the holding circuit is broken and the windings 17 and 128 deenergized. As a result the plunger 18 returns to the right and plunger 129 drops down against the face of ratchet wheel 135. The passenger moves on through the turnstile causing it to take a one-quarter revolution until one of the recesses 136 becomes aligned with the plunger 129 when it drops therein to prevent further rotation of the turnstile. As a result of these operations the passenger has passed through the turnstile into the bus where he may take a seat and has received a token representing the particular zone which he is in. It may be pointed out here that this token will permit his exit from the bus if it is still in the same zone without the further deposit of any coins but if he is in some other zone in order to make his exit from the bus he must deposit this token plus the correct amount in coins.

When the passenger decides to leave the bus if he is in the same zone in which he entered the bus, he will proceed to the exit way and deposit his token in slot 81 of the device which controls the exit turnstile. This token will fall through chute 82 into chute 83 and will stop at the lowermost set of contacts. Attention is called to the fact that we have started this description of the operation by assuming that the passenger has entered the bus in zone 1. The token which he receives as representing zone 1 is the smallest in size and may be characterized by a suitable color such as red, if desired. When this token bridges the lowermost contacts, the current flows from the positive side of the current source through the wire 94, through the token to the wire 69 and thence through contact 57 on drum switch 56 to wire 72, and then through the coil 92 to ground at 99. This energizes the solenoid 92 and draws the plunger 91 to the right to release the token into a suitable receiving compartment. The current also passes through wire 100 to one terminal of the winding 211 of the exit turnstile such as shown in Fig. 8. The current passes through this winding to the ground at 213. The energization of this coil 211 raises the plunger 212, causing it to close a holding circuit at the terminal studs 215 and 216. The current then travels from the positive side of the current source through the wire 204' to spring finger 204, contact 206, spring finger 205, wire 205', contact 216, contact member 217, contact 215, wire 214, and thence through the coil 211 to ground at 213. Thus, after the token has left the lower contacts in the chute 83, the coil 211 remains energized until the contact 206 passes out from under the fingers 204 and 205. This occurs as the passenger makes his exit through the restricted passage-way rotating the turnstile 202 one-quarter turn. As soon as the coil 211 is deenergized by this movement of the turnstile the plunger 212 drops down and falls into the recess 208 when it comes in alignment therewith thus checking the movement of the turnstile.

As the bus travels through zone 1, the shaft 47 rotates slowly and when the limit of zone 1 is reached, the spring switch 51 closes the circuit between the contacts 53 and 54 so that current flows from the positive side of the current source through the wire 55, contact 53, switch arm 51, contact 54, wire 42 and thence through the winding 33 to ground at 41. The plunger 34 moves to the right releasing the spindle 2. By this movement, the circuit to the motor 12 is closed as follows:

The current flows from the positive side of the current source through wire 38 switch-member 37, wire 39 and thence through the motor to ground at 40. This energizes the motor and causes the magazine casing mounted on the spindle 2 to be rotated through the gears 13 and 14. This continues until the circuit is broken by the passage of the switch 51 from the contacts 53 and 54 when the coil is deenergized and the spring 36 returns the plunger 34 to its normal position to engage the next notch 9 on the spindle 2. The casing 3 is, then, rotated so as to place the token magazine holding tokens representing the second zone adjacent the restricted entrance-way. A passenger entering the bus in this zone deposits a coin and secures a token representing the second zone; the operation of the circuits in this case being the same as described in connection with the operation in zone 1. The same movement of the shaft 47 has changed the connections at the spring fingers by moving a new set of contacts thereunder.

If the passenger who entered the bus in zone 2 desires to leave the bus while in that zone, he deposits the token in slot 81 (see Fig. 6) and this token will rest at the central set of contacts to again energize the magnet 92 and release the exit turnstile in a manner similar to that previously described. If a passenger who entered the bus in zone 1 desires to leave the bus in zone 2, he will deposit his token in the slot 81 and a five cent piece or other coin. This token will, since it is the smallest, stop at the lowest set of contacts and complete the circuit from wire 49 to wire 69 and thence through the spring fingers and contacts 64 to the wire 67 and to the coin in chute 85, whence the current will travel thereunder to wire 96 and finally through the coil 92 to ground at 99. The device 80 operates as before and the current travels through wire 100 to the exit turnstile as described. When the bus travels into the third zone, another pair of contacts 53 and 54 (see Fig. 3) are bridged by the switch-arm 51 and the casing will rotate as described before to place the third token magazine adjacent the restricted entrance-way. At the same time, the third set of contacts on the drum switch 56 are brought in alignment with the spring fingers. A passenger entering the bus in this zone deposits his coin and gets the largest size token representing this zone. When he desires to leave the bus, he deposits this token in slot 81 which bridges the upper set of contacts in chute 83 to close the circuit from wire 94 to 71 and thence through the spring fingers and contact 59 to wire 70. The current then travels from wire 70 through the coil 92 to ground at 99 to cause the device to operate as before. The current also travels through wire 100 to the exit turnstile as previously described. If a passenger who has entered the bus in zone 1 desires to leave it in zone 3, he deposits his token and two coins in slot 81 to complete the circuits as follows: The current flows through the wire 94, through the lower set of contacts in chute 83 which are bridged by the token representing zone 1 and thence to the wire 69 and through the spring finger connected thereto to the contact 62, through the spring finger connected to wire 68 to the left hand middle contact of chute 85, through wire 96 to the coil 92 and then to ground at 99. The current also travels through wire 100 to the exit turnstile as described before. It is of course to be noted that the drum switch 56 has moved over so that the third set of contacts, 59, 60 and 62 are under the spring fingers. If the passenger instead of depositing two five cent pieces in the chute 85, deposits a ten cent piece in the chute 84, the current will travel as before to wire 68 and thence through wire 98, the ten cent piece, wire 97 and through the coil 92 to ground at 99. Thus, the passenger who entered the bus in zone 1 may depart from it in zone 3 by depositing a token and two five cent pieces, or a token and a single ten cent piece. If a passenger who entered the bus while it was in zone 2 desires to leave the bus when it is in zone 3, he deposits the token, which he received, in the slot 81 from which it travels to the middle set of contacts in the chute 83. The current then travels from the wire 94 through the token to wire 73, to its connected spring finger, through contact 60, through the spring finger connected to the wire 66 and through the wire 66 to a single coin in chute 85, through the coin to wire 96 and thence through the coil to ground at 99. Should the passenger for any reason misplace or lose the token which he receives on entering the bus, he may make his exit from the bus at any point in the system by depositing three five cent pieces in the coin chute 85. The current will then travel through wire 95, the uppermost coin, wire 96, coil 92 and finally to ground at 99.

From the previous description it will be apparent that I have described a three zone system where five cents is charged for the privilege of traveling in each of the zones so that a passenger may make a complete trip over the system for fifteen cents. These values are however arbitrarily taken since it is evident that the amount of such fares will depend upon the number and length of zones in the system. It will be evident that if it is desired to charge less than five cents for each particular zone in which the passenger travels, for instance three cents, that tokens of suitable size may be sold for three cents which would operate the device as previously described. It will be evident then that I do not desire to be limited to the operation of my device by tokens and money since the whole apparatus may be controlled by suitable tokens which can be sold for any pre-arranged amount. I can of course, arrange the barriers so that the same barriers which are coin or token controlled for entrance, may be arranged for coin and/or token exit operations. In other words, each entrance turnstile may be also operated as an exit turnstile by connecting it to a suitable token and/or coin operated device.

I wish it to be particularly understood that the principles of my invention are not limited to the particular turnstile barrier shown by me since any form of movable gate or even doors may be readily operated by means of the apparatus of my invention. It may be pointed out, at this point, that while I have disclosed the device which operates the entrance turnstile as being controlled by means of a coin, it will be immediately apparent that this device could be operated by means of tokens which could be sold in quantities as is often done at the present time. In fact any metallic object of proper size and shape would be suitable for operating these devices and I do not therefore desire to be limited to coins since I am using this term in an illustrative sense in both the specification and claims.

It will be apparent from the foregoing disclosure that I have devised a very simple and efficient system for permitting the zoning of all types of transportation systems, including bus systems whereby the passenger may be charged in proportion to the length of the trip which he takes.

By means of the apparatus of my invention it is at once apparent that I have eliminated the necessity of employing conductors or attendants which are usually necessary in the operation of such systems and which represent a considerable portion of the operating expense of such a system.

I have also eliminated the use of tickets, etc. and have substituted for all of these, a simple metallic token, representing by its size and color the particular zone at which it was delivered. The passenger therefore has only to deposit one or more coins of a predetermined value to receive a token and gain admittance to the restricted areas of the platforms or the bus or car platforms. He has also only to deposit that token with or without additional coins depending on how far he has traveled to effect his exit from any other station or point of the system.

I also intend to include within the scope of my invention, the idea of arranging exit and entrance turnstiles in combination with controlling devices to permit the transfer of a passenger from one system to another, thus, if the passenger is riding on a bus for instance, and desires to transfer to a subway train at a transfer point, he may, by depositing the token which he has in apparatus provided therefor, secure a transfer token at the time he makes his exit from the bus. This transfer token when deposited in a suitable device adjacent the entrance turnstile of a subway system will permit his passage therethrough and will cause the ejection of a token which will permit his exit from any station of the subway system either alone or in combination with one or more coins. It will be apparent that apparatus for these operations will not differ in any great detail from the present token operated devices. The only important difference will be, that the device which controls the exit turnstile of the first system at the transfer point, will be adapted to deliver a transfer token of suitable characteristics which will permit the passenger's entrance to the restricted area of the subway system at the transfer point. The device which controls the entrance turnstile to the subway at the transfer point will be particularly adapted for operation by the transfer token and will also be adapted to deliver a token of suitable characteristics for use on the subway system. The principles of my invention can, of course, be applied at the transfer points from and to any types of common carrier systems.

While I have disclosed the operation of the token delivering mechanism at the entrance-way of the bus in connection with an entrance turnstile, I wish it to be distinctly understood that all of the advantages of this invention may be secured without the use of an entrance turnstile. In other words the token delivering mechanism will be placed adjacent the entrance-way of the bus and will, upon the deposit of a coin, deliver a token as described. The passenger may then move into the bus. If any passenger should enter without depositing a coin and receiving a token that is immaterial since he cannot get out of the bus without paying the proper fare. However all entering passengers will be under the eye of the bus driver as is the present case. A similar situation occurs in connection with the use of the device on street cars. In both cases an entrance turnstile may crowd the entrance way too much or may impede the movement of passengers into the vehicle too greatly, so that the system can easily be operated with all the advantages thereof without the use of an entrance turnstile.

One of the decided advantages of this system is that it may be used in connection with overlapping zones in order that passengers may only be charged the full minimum fare if they enter and exit from a vehicle at any point in a zone. Thus if the maximum ride which is given for five cents is say six miles, that is the length of a zone, the system may be arranged so that a passenger would be guaranteed a minimum ride of, for example, four miles. The main objection to the present zoning systems is that no provision is made for passengers who may board the vehicle near the end of one zone and only travel part of the way in the second zone. The overlapping of zones can be accomplished without changing the fundamentals of the system by merely changing the relative positions of the contacts on the drum switch and the relative lengths thereof in a manner which will be immediately apparent to one skilled in the art. The indicating device in the bus can also be arranged or marked so that the passengers in the bus will know when they are passing from that portion of one zone to another portion where an additional fare will be required.

While I have disclosed in connection with the apparatus to be applied to buses and other road vehicles as being operated from some moving part of the vehicle, I wish it to be understood that the token delivering device could be manually rotated, mechanically rotated or pneumatically rotated, as well as electrically as I have described it in connection with the present disclosure.

I am, of course, very well aware that many changes in the detail of construction, relative arrangement of parts and circuital connections will readily occur to those skilled in the art and I do not therefore desire to be limited to these particular features as disclosed by me for purposes of illustration. This is particularly apparent in connection with the wiring of the different coin and/or token operated devices since the number and arrangements of circuits will depend upon the number of zones in a given station. I, therefore, only desire and intend to be limited to the aspects of my invention as I have defined them in the appended claims.

What I seek to secure by United States Letters Patent is:

1. In a zoning system the combination with a restricted entrance-way and a restricted exit, barriers in said ways, means actuated by a coin for releasing the barriers of the entrance-way and delivering a token, and means controlled by the token representing the relative position of the exit way with respect to the point of travel at which delivery of the token was effected for releasing the barriers of the exit way.

2. In a zoning system the combination with a restricted entrance-way and a restricted exit-way, barriers in said ways, electrical means actuated by a coin for releasing the barriers of the entrance-way and delivering a token, and electrical means controlled by the token or the token and coins depending on the relative position of the exit-way with respect to the point of travel to which delivery of the token was effected for releasing the barriers of the exit way.

3. In a zoning system the combination with a restricted entrance-way and a restricted exit-way, barriers in said ways, electrical means actuated by a coin for releasing the barrier of the entrance-way and delivering a token, and electrical means controlled by the token which represents the relative position of the exit-way with respect to the point of entrance at which delivery of the token was effected for releasing the barriers of the exit way.

4. In a zoning system the combination with a restricted entrance-way and a restricted exit-way, barriers in said ways, means actuated by a coin for releasing the barrier of the entrance-way and delivering a token, and electrical means controlled by the token or the token and coins depending on the relative position of the exit-way with respect to the point of travel at which delivery of the token was effected for releasing the barriers of the exit-way.

5. The combination with a bus or street car having passage-ways thereon and barriers in said passage-ways, of means for delivering a token and releasing said barriers for entrance operation on the deposit of a coin, said means being controlled by the movement of the bus to adapt it for delivery of a token representing the zone in which the bus is traveling.

6. The combination with a bus or street car having entrance and exit ways and barriers in said ways, of means controlled by the movement of said bus or street car for delivering a token and releasing said entrance barriers upon the deposit of a coin, and means for releasing said exit barriers on the deposit of said token or said token and coins.

7. The combination with a bus or street car having entrance and exit ways and barriers in said ways, of means for delivering a token and releasing said entrance barriers upon the deposit of a coin, and means for releasing said exit barriers on the deposit of a token or a token and coins, said token delivery device being adapted by the movement of the bus to deliver a token representative of the zone in which the bus is moving upon delivery.

8. The combination with a bus having entrance and exit ways and barriers in said ways, of means for delivering a token and releasing said entrance barriers upon the deposit of a coin, means for releasing the exit barriers upon the deposit of a token or a token and coins, and means driven from the drive shaft of the bus for controlling the token delivering device to cause it to deliver a token representative of the zone in which the bus is traveling.

9. The combination with a passenger vehicle having entrance and exit ways and barriers in said ways, of means for delivering a token and releasing said entrance barriers, and means for releasing said exit barriers upon the deposit of said token if the vehicle is in the same zone.

10. The combination with a passenger vehicle having entrance and exit ways and barriers in said ways, of means for delivering a token and releasing said entrance barriers, and means for releasing said exit barriers upon the deposit of said token if the vehicle is in the same zone, said means being controlled by the movement of said vehicle for adapting said token delivering device to deliver a token representative of the zone in which the vehicle is traveling.

11. The combination with a passenger vehicle having entrance and exit ways, and barriers in said ways, of means for delivering a token and releasing said entrance barriers, means for releasing said exit barriers upon the deposit of said token if the vehicle is in the same zone, and means for indicating the approach of the vehicle to the end of each zone.

12. The combination with a passenger vehicle having entrance and exit ways and barriers in said ways, of means including a plurality of token magazines for delivering a token and releasing the entrance turnstiles upon the deposit of a coin, and means rendering operative the particular token magazine representative of the zone in which the vehicle is traveling.

13. The combination with a passenger vehicle having entrance and exit ways, and barriers in said ways, of means including a plurality of token magazines for delivering a token and releasing the entrance turnstiles upon the deposit of a coin, means rendering operative the particular token magazine representative of the zone in which the vehicle is traveling, and means for releasing the exit barriers if the vehicle is in the same zone in which the delivery of the token was effected upon the deposit of that token.

14. The combination with a passenger vehicle having entrance and exit ways and barriers in said ways, of means including a plurality of token magazines for delivering a token and releasing the entrance turnstile upon the deposit of a coin, means rendering operative the particular token magazine representative of the zone in which the vehicle is traveling, and means for releasing the exit turnstile upon the deposit of a token, or a token and coins.

15. The combination with a passenger vehicle having a drive shaft, of means having a plurality of token magazines for delivering a token upon the deposit of a coin, and means operated by said drive shaft for making available for coin operation the particular token magazine representing the zone in which the vehicle is moving.

16. A token delivering device comprising a casing having a plurality of coin slots therein, a token magazine for each slot, chutes into which said slot opens, contacts on said chutes, means connected to said contacts for ejecting a token when bridged by a coin, means for releasing said coin, means externally controlled for placing a token magazine under the influence of said ejecting means according to predetermined conditions.

17. In a system of the type described in combination with a moving vehicle of means connected to a moving part thereof for operation thereby to deliver, upon deposit of a coin, a token having a characteristic designating the zone in which a person enters the vehicle.

18. The combination with a passenger vehicle having an entrance-way and means for moving said vehicle of means for delivering a token mounted adjacent said entrance way and connected to the means for driving the vehicle whereby it will be set to deliver a token characteristic of the zone of entrance of the passenger.

19. The combination with a passenger vehicle and means thereon which moves an amount proportional to the distance travelled by the vehicle, of token delivering means connected to and operated by said means for delivering a token representative of the zone in which the vehicle is traveling.

20. The combination with a passenger vehicle having an entrance-way of means mounted adjacent said entrance way for delivering a token and means connecting said token delivering means to a moving part of the vehicle, said token delivering means delivering, upon the deposit of a coin, a token having characteristics determined by the distance the vehicle has moved from a given point.

21. The combination with a passenger vehicle in a zoned system, of means for delivering a token characteristic of the zone in which entry is made into the vehicle, means for controlling the token delivering means to set it to eject a token characteristic of the zone in which the vehicle is traveling at the time of entry, and indicator means on the vehicle and controlled by said means for controlling the token delivering means for signaling to the passengers the zone in which the vehicle is traveling and when the vehicle is approaching a zone limit.

In testimony whereof I have hereunto set my hand on this 1st day of October A. D., 1929.

JOHN W. HULME.